(12) United States Patent  
Kunimochi

(10) Patent No.: US 7,918,597 B2  
(45) Date of Patent: Apr. 5, 2011

(54) SPREAD ILLUMINATING APPARATUS

(75) Inventor: Toru Kunimochi, Kitasaku-gun (JP)

(73) Assignee: Minebea Co., Ltd., Nagano (JP)

( * ) Notice: Subject to any disclaimer, the term of this patent is extended or adjusted under 35 U.S.C. 154(b) by 266 days.

(21) Appl. No.: 12/285,930

(22) Filed: Oct. 16, 2008

(65) Prior Publication Data  
US 2009/0135623 A1 May 28, 2009

(30) Foreign Application Priority Data  
Nov. 27, 2007 (JP) ................. 2007-305175

(51) Int. Cl.  
*F21V 7/04* (2006.01)

(52) U.S. Cl. ........ 362/608; 362/612; 362/613; 362/619; 362/620

(58) Field of Classification Search .......... 362/608, 362/612, 613, 619, 620  
See application file for complete search history.

(56) References Cited

U.S. PATENT DOCUMENTS  
7,370,999 B2 * 5/2008 Feng et al. ................ 362/608

FOREIGN PATENT DOCUMENTS

| JP | A-2002-042534 | 2/2002 |
| JP | A-2003-234004 | 8/2003 |
| JP | A-2004-327096 | 11/2004 |
| JP | A-2005-071971 | 3/2005 |
| JP | A-2007-200736 | 8/2007 |

* cited by examiner

*Primary Examiner* — Stephen F Husar  
(74) *Attorney, Agent, or Firm* — Oliff & Berridge, PLC

(57) ABSTRACT

A spread illuminating apparatus is provided where: a light introducing prism mechanism is formed at a light entrance surface of a light guide plate wherein the prism mechanism includes a plurality of prism pieces extending in the thickness direction of the light guide plate and including first and second light incidence faces which have respective different inclination angles relative to the light entrance surface such that the first and second light incidence face are inclined relative to the light incidence surface at an angle ranging from 0 degree to 30 degrees and at an angle ranging from 45 degrees to 90 degrees; a light emitting pattern is formed at the bottom surface of the light guide plate such that prisms are continuously disposed in a step-like manner in the direction perpendicular to the light entrance surface; and a light diffusing pattern is formed at the top surface of the light guide plate such that arc prisms are disposed in the direction parallel to the light entrance surface.

8 Claims, 10 Drawing Sheets

F I G. 5 A
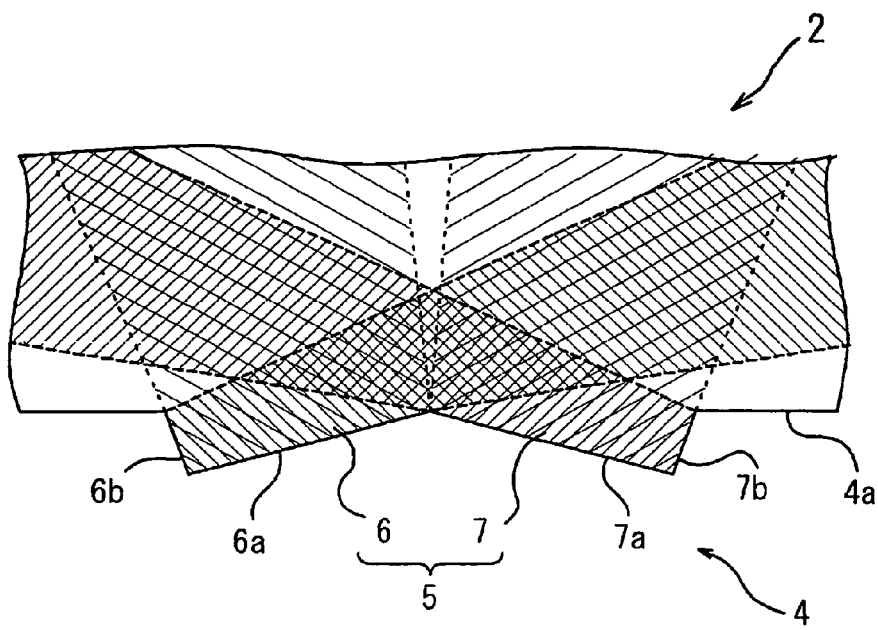
F I G. 5 B
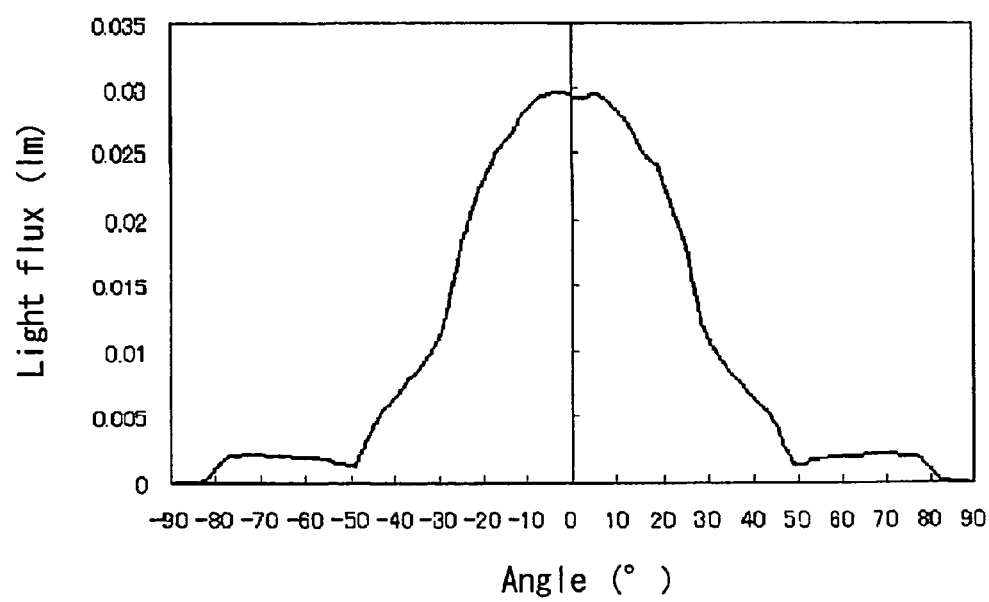

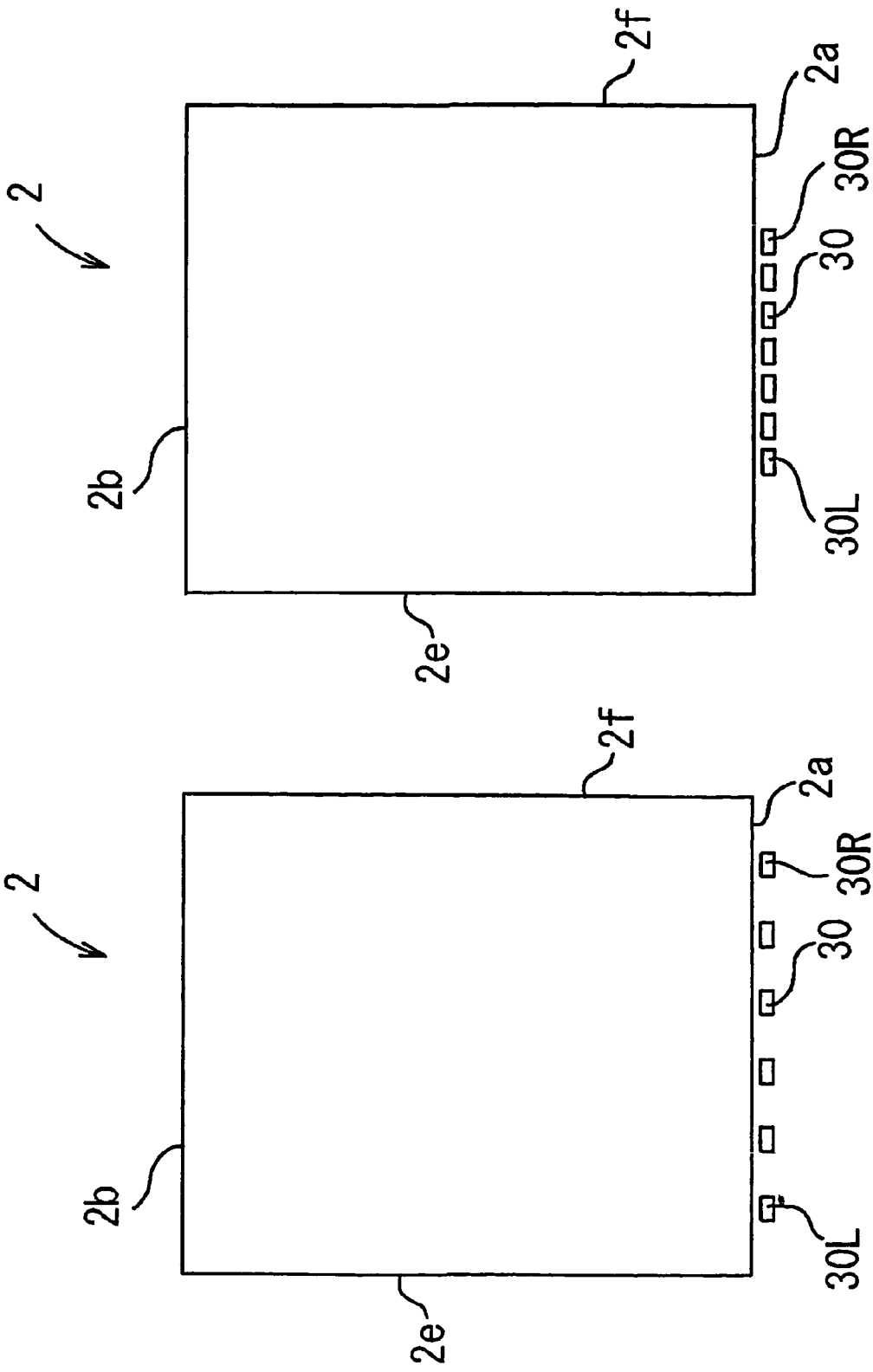

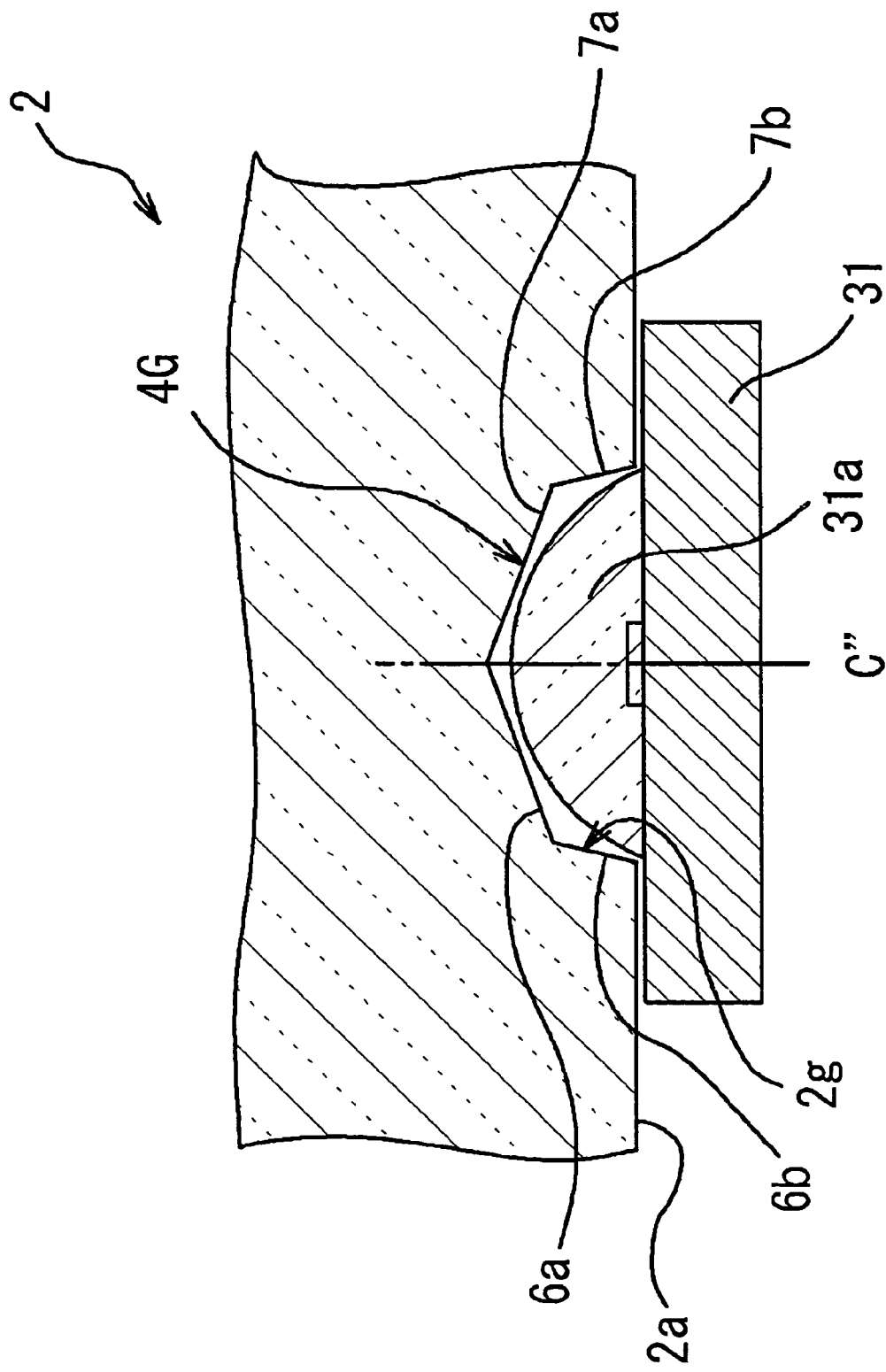

SPREAD ILLUMINATING APPARATUS

BACKGROUND OF THE INVENTION

1. Field of the Invention

The present invention relates to a spread illuminating apparatus of side light type, in which a point light source such as a light emitting diode (LED) is used as a light source, and more particularly to a spread illuminating apparatus suitable as a backlight for a liquid crystal display panel.

2. Description of the Related Art

A liquid crystal display (LCD) panel characterized in having a small thickness does not emit light by itself and therefore needs an illuminating means for displaying images. A spread illuminating apparatus of side light type, which is structured such that a light source is disposed at a side surface (light entrance surface) of a light guide plate disposed under an LCD panel, is widely used as such an illuminating means, especially in the filed of small portable information devices, such as a mobile phone.

In order to achieve a high quality display on an LCD panel, it is always required for the spread illuminating apparatus to provide enhanced brightness uniformity, and various improvement approaches have been developed in order to meet the requirements. For example, a light emitting pattern composed of a plurality of prisms and disposed at the light reflection surface (bottom surface) of the light guide plate is structured such that the number of prisms per area gradually increases with an increase in distance from the light entrance surface of the light guide plate, whereby light is emitted substantially uniformly from the entire area of the light emitting surface (top surface) of the light guide plate regardless of the distance from the light emitting surface. Also, a light diffusing sheet to diffuse light emitted from the light guide plate to thereby make the emitted light uniform, and two prism sheets to adjust directivity characteristics with respect to two axial directions orthogonal to each other are disposed at the light emitting surface in a laminating manner, whereby illumination light is made further uniform.

When a point light such as an LED is used as a light source disposed at the light entrance surface of the light guide plate, a light introducing prism mechanism is generally disposed at the light entrance surface, whereby light emitted from the LED and introduced into the light guide plate is spread in the direction parallel to the light entrance surface of the light guide plate so that illumination light is available also at the corner portions of the light guide plate (refer to, for example, Japanese Patent Application Laid-Open No. 2002-42534).

Also, a light diffusing pattern composed of a plurality of prisms (ridge-and-groove structure) is disposed at the light emitting surface of the light guide plate, wherein the prisms extend in the direction substantially perpendicular to the light entrance surface of the light guide plate, whereby light traveling in the light guide plate is diffused in the direction parallel to the light entrance surface and illumination light is made further uniform (refer to, for example, Japanese Patent Application Laid-Open No. 2003-234004).

However, a spread illuminating apparatus, in which a light introducing prism mechanism is formed at a light entrance surface of a light guide plate, a light emitting pattern is formed at a light reflecting surface of the light guide plate, a light diffusing pattern is formed at a light emitting surface of the light guide plate, and a light diffusing sheet and two prism sheets are disposed at the light emitting surface, has the following problem. FIG. 10 shows such a conventional spread illuminating apparatus as described above, in which while illumination light is emitted from the light emitting surface of the light guide plate in a uniform manner on the whole, two bright lines are visibly present symmetrically to each other in the neighborhood of a light entrance surface 101a of a light guide plate 101, close to which an LED 102 is disposed. The bright lines are formed respectively along lines inclined about 50 degrees in both directions from an optical axis (an axis extending from the center of the LED 102 in the direction perpendicular to the light entrance surface 101a). If such bright lines can be well covered up by a frame-shaped sheet disposed at the light emitting surface of the light guide plate 101, the brightness uniformity is not disturbed thus raising no practical problem. However, in order to achieve a small spread illuminating apparatus with a narrowed frame in which an area covered by a light blocking sheet thus becoming unusable as an illumination region (ineffective area) is reduced for the purpose of meeting ever increasing demands for further downsizing the apparatus, the generation of bright lines which deteriorate the brightness uniformity must be suppressed.

The present invention has been made in light of the foregoing, and it is an object of the present invention to provide a spread illuminating apparatus of side light type, in which bright lines are suppressed from being generated in the neighborhood of a point light source such as an LED, and good brightness uniformity is achieved.

In order to accomplish the present invention, the present inventor attempted to study and clarify the mechanism for causing the generation of bright lines the present invention is to address. Based on the obtained findings about the mechanism for causing the generation of bright lines, the inventor made further investigations, and the present invention has been accomplished. So, for facilitating understanding of the present invention, the cause for generating bright lines in conventional spread illuminating apparatuses will be explained with reference to FIG. 10.

First, attention is paid to the behavior of light traveling in the light guide plate 101 in the optical axis direction. In the explanation below, the angle at which light travels in the optical axis direction is defined as 0 degree (hereinafter, the angle is referred to as "travel angle" or simply as "angle"). Light traveling with a travel angle of 0 degree is reflected or scattered at the light emitting pattern disposed at the bottom surface (light reflecting surface) of the light guide plate 101, and light reflected or scattered and incident on the top surface (the light emitting surface, exactly the surface of the light disusing pattern) of the light guide plate 101 at an angle smaller than a critical angle θc of the material of the light guide plate 101 is adapted to pass through the top surface of the light guide plate 101 and becomes illumination light.

Then, the travel angle is sequentially changed with the light flux kept virtually constant from 0 degree until light is caused to travel in the direction parallel to the light entrance surface 101a. While this change is seen from above the top surface of the light guide plate 101, it comes to a point where light is incident on the prism of the light diffusing pattern (ridge-and-groove-structure) formed at the top surface of the light guide plate 101 at the critical angle θc with respect to the ridge direction of the prism. Since the prism of the light diffusing pattern is formed to extend in the direction perpendicular to the light entrance surface 101a, the travel angle of the light incident on the prism at the critical angle θc is (90−θc) degrees. Light with a travel angle of less than (90−θc) degrees has its angle changed by reflection or scatter at the light emitting pattern like the light with a travel angle of 0 degree until the travel angle reaches or exceeds (90−θc) degrees, only after which the light is allowed to exit the light guide plate 101 from the top surface as illumination light. On the other hand, light which has a travel angle of greater than (90−θc) degrees already at the beginning is allowed to pass through the surface of the light diffusing pattern as illumination light without having the travel angle changed at the light emitting pattern.

Thus, light traveling in the direction centered on the optical axis (traveling through a region A defined between two broken lines shown in FIG. 10) has its incidence angle changed with respect to the top surface of the light guide plate 101 by means of the light emitting pattern formed at the bottom surface of the light guide plate 101 and thereby is adapted to exit the light guide plate 101 from the top surface (hereinafter, this emission mode is referred to as "light emission mode A"). On the other hand, light traveling in the direction defining a travel angle of greater than about (90−θc) degrees (traveling through a region B defined between each broken line and the light entrance surface 101a shown in FIG. 10) is adapted to exit the light guide plate 101 from the top surface without changing the travel angle at the light emitting pattern (hereinafter, this emission mode is referred to as "light emission mode B"). That is to say, the light emission mode differs on reaching a travel angle of (90−θc) degrees, and in this case, if lights are simultaneously emitted to travel in all the directions, brightness discontinuity is caused to appear along the direction of the angle of (90−θc) degrees. Specifically, when the light guide plate 101 is made of polycarbonate having a refractive index of 1.58, since the polycarbonate has a critical angle θc of 39.2 degrees with respect to air, the direction of (90−θc) degrees, along which the brightness discontinuity appears, is about 50.8 degrees. This direction substantially agrees with the direction along which a bright line visibly appeared in a research prototype.

The amount per unit area of light emitted from the top surface of the light guide plate 101 is compared between the light emission mode A and the light emission mode B, and it is shown that the amount emitted by the light emission mode A is smaller than the amount emitted by the light emission mode B. This means that the illumination light is brighter at the region B than at the region A. This is attributed to that the light emitting pattern for the light emission mode A is structured such that incidence angle relative to the top surface of the light guide plate 101 gradually decreases so that light is adapted to gradually exit from the top surface of the light guide plate 101. It becomes more likely that the brightness is higher at the region B especially when the light emitting pattern is formed such that a pattern density decreases with a decrease in distance to the light entrance surface 101a, in which case the brightness difference at the brightness discontinuity area becomes larger.

As is well known, the amount of light (light flux) traveling in the light guide plate 101 practically varies depending on the travel angle, specifically, decreases with an increase in travel angle. Consequently, the illumination light brightness decreases largely with a decrease in distance to the light entrance surface 101a while it departs from the brightness discontinuity area. So, it was assumed that observers view the brightness discontinuity area as a bright line because the brightness considerably decreases with a decrease in distance to the light entrance surface 101a while the brightness discontinuity area is generated.

SUMMARY OF THE INVENTION

In order to achieve the object described above, according to an aspect of the present invention, there is provided a spread illuminating apparatus including a point light source, and a light guide plate including: a light entrance surface provided with a light introducing prism mechanism, the point light source being disposed to face the light entrance surface; a major surface provided with a light emitting pattern for emitting light from the point light source in a spread manner; and another major surface provided with a light diffusing pattern having a ridge-and-groove structure with a plurality of ridges and grooves extending in a direction perpendicular to the light entrance surface, wherein the light introducing prism mechanism includes a plurality of prism pieces which are arrayed along the light entrance surface and each of which includes a first light incidence face for introducing the light from the point light source into the light guide plate in a direction generally perpendicular to the light entrance surface and a second light incidence face for introducing the light from the point light source into the light guide plate in a direction generally parallel to the light entrance surface.

In the aspect of the present invention, the first light incidence face of the prism piece may be inclined relative to the light entrance surface of the light guide plate at an angle ranging from 0 degree to 30 degrees, and the second light incidence face of the prism piece may be inclined relative to the light entrance surface at an angle ranging from 45 degrees to 90 degrees.

In the aspect of the present invention, when the light from the point light source is introduced into the light guide plate through the light introducing prism mechanism, a local minimum may be found at a light flux traveling in a direction inclined relative to the optical axis at an angle of substantially (90−θc) degrees where θc is a critical angle of a material for the light guide plate.

In the aspect of the present invention, the light introducing prism mechanism may include a plurality of prism pairs which are disposed along the light entrance surface of the light guide plate and which are each constituted such that adjacent two of the plurality of prism pieces are disposed symmetrically to each other.

In the aspect of the present invention, a flat portion may be disposed between adjacent two of the second light incidence faces.

In the aspect of the present invention the light introducing prism mechanism may include two prism arrays which are each structured such that the plurality of prism pieces are arrayed in succession in a parallel shift manner along the light entrance surface of the light guide plate and which are formed symmetrically to each other.

In the aspect of the present invention, the point light source may include a semi-cylindrical lens portion, and the light introducing prism mechanism may include a prism pair which is constituted such that two of the plurality of prism pieces are disposed symmetrically to each other at the wall surface of a recess disposed at the light entrance surface of the light guide plate so as to house the lens portion of the point light source.

In the aspect of the present invention, the light emitting pattern may have a light emission ratio increasing with an increase in distance from the light entrance surface of the light guide plate.

According to the present invention, a spread illuminating apparatus of side light type is provided in which bright lines are suppressed from being generated in the neighborhood of a point light source such as an LED, and good brightness uniformity is achieved.

BRIEF DESCRIPTION OF THE DRAWINGS

FIG. 5A is an explanatory view of traveling directions of lights introduced into the light guide plate from the light introducing prism mechanism of FIG. 2, and FIG. 5B is a light distribution graph of light introduced from the light introducing prism mechanism;

FIG. 7A is an explanatory view of a conventional array of LEDs, and FIG. 7B is an explanatory view of an array of LEDs feasible according to the present invention;

FIG. 9 is a horizontal cross sectional view of another example of light introducing prism mechanism for the spread illuminating apparatus according to the present invention.

DETAILED DESCRIPTION OF THE INVENTION

Figure 1:
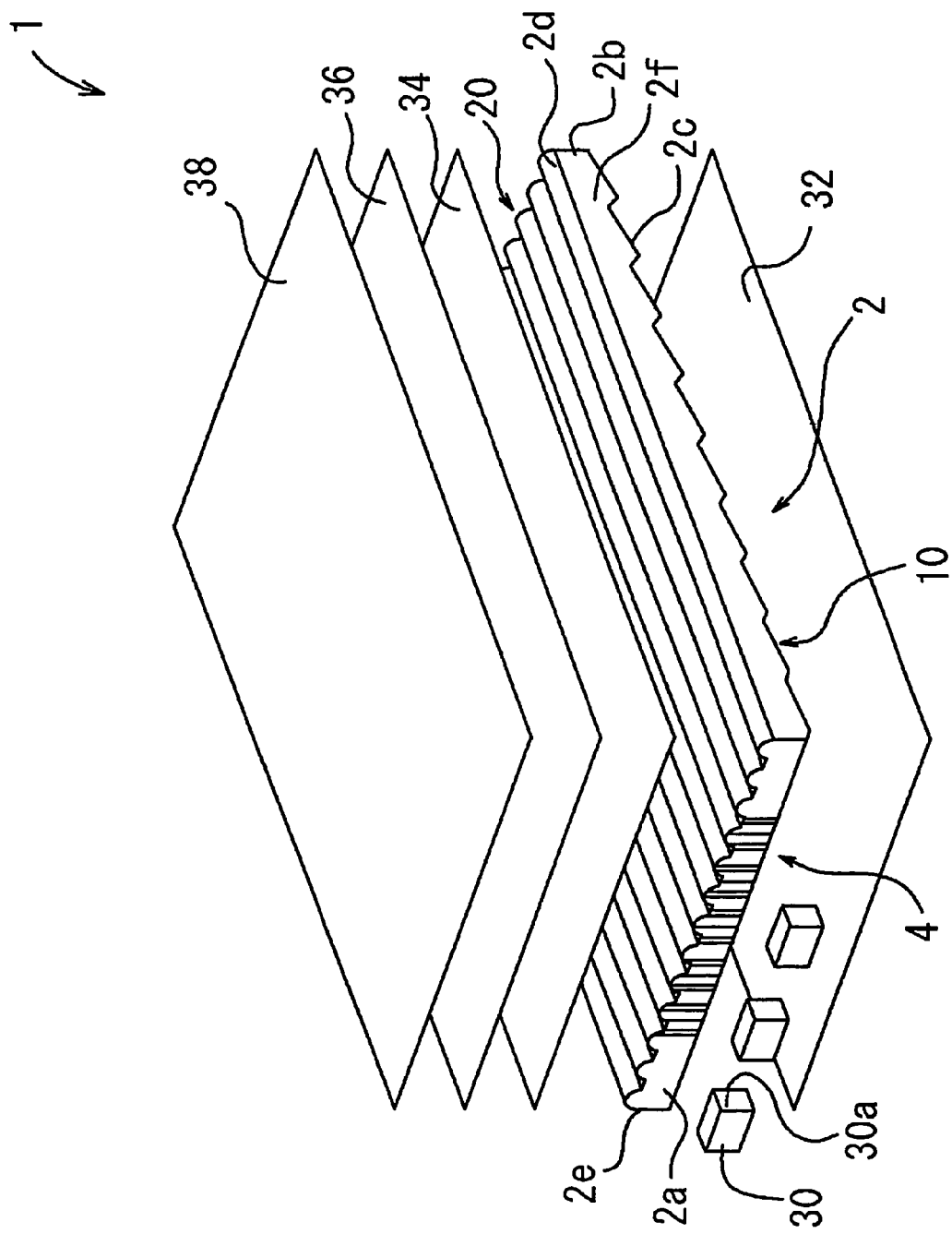
FIG. 1 is an exploded perspective view of a spread illuminating apparatus according to an embodiment of the present invention.

An exemplary embodiment of the present invention will be described with reference to the accompanying drawings. In the drawings, the configurations or the like of constituent components are exaggerated as appropriate for a better understanding of the present invention.

Referring to FIG. 1, a spread illuminating apparatus 1 according to an embodiment of the present invention includes a light guide plate 2 having a substantially rectangular shape, and LEDs 30 as point light sources disposed to face one side surface (light entrance surface) 2a of the light guide plate 2.

A light reflecting sheet 32 is disposed at one major surface, specifically a bottom surface (light reflecting surface) 2c of the light guide plate 2. The light reflecting sheet 32 is adapted to reintroduce into the light guide plate 2 light emitted from the LED 30 into the light guide plate 2 and leaking out from the bottom surface 2c. A light diffusing sheet 34 and a pair of prism sheets 36 and 38 are disposed in a laminating manner at another major surface, specifically a top surface (light emitting surface) 2d of the light guide plate 2. The light diffusing sheet 34 is adapted to diffuse light emitted from the top surface 2d of the light guide plate 2 thereby making the brightness uniform. The pair of prism sheets 36 and 38 are arranged such that both of their prism surfaces face upward (in the direction opposite to the light guide plate 2) and also that both of their prism ridge lines are perpendicular to each other, whereby the directivity characteristics of the light diffused by the light diffusing sheet 34 are adjusted with respect to two axial directions orthogonal to each other.

Description will now be made on the structure of the light guide plate 2. The light guide plate 2 is made of a transparent material (for example, polycarbonate resin). A light introducing prism mechanism 4 is formed at the light entrance surface 2a of the light guide plate 2 so as to protrude with respect thereto. The light introducing prism mechanism 4 is adapted to cause light emitted from the LED 30 and introduced into the light guide plate 2 through the light entrance surface 2a to travel with a desired light distribution with respect to the direction parallel to the major surface of the light guide plate 2. Also, a light emitting pattern 10 is formed at the bottom surface 2c of the light guide plate 2. The light emitting pattern 10 is adapted to reflect or scatter light traveling in the light guide plate 2 and incident on the bottom surface 2c toward the top surface 2d of the light guide plate 2, whereby the light exits the light guide plate 2 from the top surface 2d in a spread manner. And, a light diffusing pattern 20 is formed at the top surface 2d of the light guide plate 2. The light diffusing pattern 20 is mainly adapted to diffuse light traveling in the light guide plate 2 and incident on the top surface 2d in the direction parallel to the light entrance surface 2a.

Figure 2:
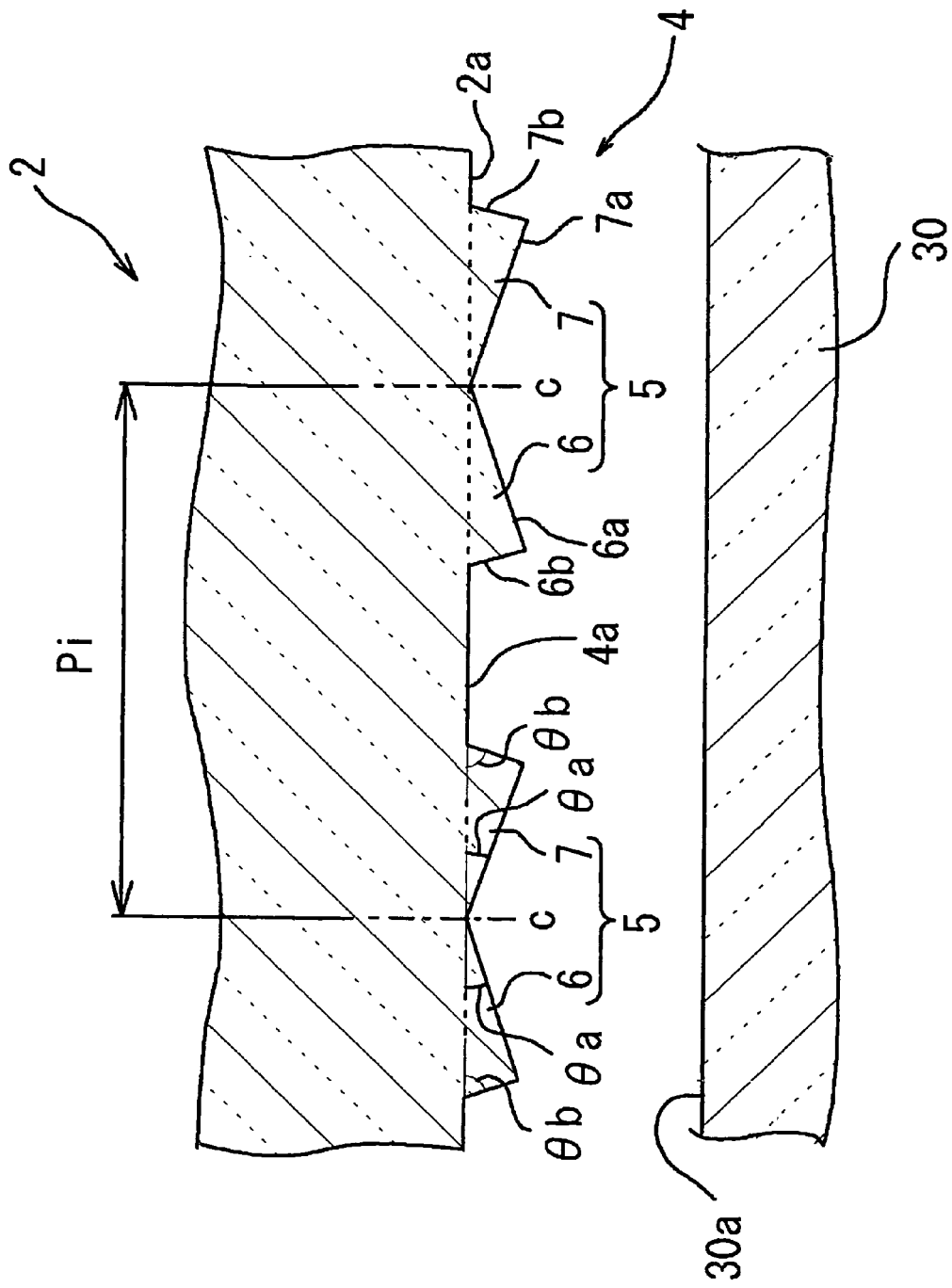
FIG. 2 is an enlarged horizontal cross sectional view of a relevant portion of an example of light introducing prism mechanism of the spread illuminating apparatus of FIG. 1.

The light introducing prism mechanism 4 is formed to extend in the direction of the thickness of the light guide plate 2 (direction of the shorter side of the light entrance surface 2a) as shown in FIG. 1. Referring to FIG. 2, the light introducing prism mechanism 4 is composed of a plurality of prism pairs 5 arrayed repeatedly along the light entrance surface 2a of the light guide plate 2, wherein each prism pair 5 is composed of a first prism piece 6 and a second prism piece 7 which are disposed reflection-symmetrically with respect to each other. The first prism piece 6 of the prism pair 5 includes a first light incidence face 6a which is inclined at a small angle with respect to the light entrance surface 2a thus oriented nearly parallel thereto and a second light incidence face 6b which is inclined at a large angle with respect to the light entrance surface 2a thus oriented nearly perpendicular thereto, and the second prism piece 7 includes a first light incidence face 7a which is inclined at a small angle with respect to the light entrance surface 2a thus oriented nearly parallel thereto and a second light incidence face 7b which is inclined at a large angle with respect to the light entrance surface 2a thus oriented nearly perpendicular thereto. Thus, the prism pair 5 includes the first light incidence faces 6a and 7a having a small inclination angle to the light entrance surface 2a and the second light incidence face 6b and 7b having a large inclination angle to the light entrance surface 2a. The first light incidence faces 6a and 7a are adapted to cause light emitted from the LED 30 to travel in the direction generally perpendicular to the light entrance surface 2a, and the second light incidence faces 6b and 7b are adapted to cause light emitted from the LED 30 to travel in the direction generally parallel to the light entrance surface 2a. Since the prism pairs 5 of the light introducing prism mechanism 4 are each structured such that the first and second prism pieces 6 and 7 are disposed reflection-symmetrically to each other, light incident is distributed symmetrically about the optical axis in an equal manner, whereby the bright lines caused to appear symmetrically are suppressed in a balanced manner and at the same time the brightness uniformity at the neighborhood of the light entrance surface 2a is enhanced in a balanced manner.

A symmetry plane C between the pair of prism pieces 6 and 7 is perpendicular to the light entrance surface 2a which includes a line passing the meeting point between the adjacent two first light incidence faces 6a and 7a. Accordingly, respective angles the first light incidence surface 6a and the first light incidence face 7a make with the light entrance surface 2a are identical (θa) with each other, and respective angles the second light incidence face 6b and the second light incidence face 7b make with the light entrance surface 2a are identical (θb) with each other. In this connection, the angle θa is smaller of two angles formed between the first light incidence face 6a (7a) and the light entrance surface 2a, and the angle θb is smaller of two angles formed between the second light incidence face 6b (7b) and the light entrance surface 2a. In the present embodiment, the angle θa is 15 degrees, and the angle θb is 70 degrees. Also, in the present embodiment, the meeting point between the adjacent two first light incidence faces 6a and 7a is located on the line (broken line in the figure) indicating the extension of the light entrance surface 2a, but the present invention is not limited to such a positional arrangement insofar as the meeting point coincides with the symmetry plane C. Further, the prism pair 5 may be structured such that the pair of prism pieces 6 and 7 are arranged with their respective second light incidence faces 6b and 7b meeting with each other at the symmetry plane C, rather than with the first light incidence faces 6a and 7a meeting with each other.

In the present embodiment, a flat portion 4a having a predetermined width is provided between two adjacent prism pairs 5 (specifically, between the second light incidence face 6b of a first prism pair 5 and the second light incidence face 7b of a second prism pair 5). The flat portion 4a is designed to prevent light to be incident on the second light incidence face 6b of the first prism pair 5 from being blocked by the second prism pair 5. As a result, the light distribution can be controlled precisely, whereby the bright lines are further reliably prevented from being generated and at the same time the brightness uniformity at the neighborhood of the light entrance surface 2a is enhanced.

The width of the flat portion 4a is preferably determined as follow. A virtual plane is established which passes an end of the second light incidence face 6b of the first prism pair 5, the end located closer to the light entrance surface 2a of the light guide plate 2, and which is inclined at an angle (absolute angle) of 60 degrees with respect to the optical axis. Then, the second prism pair 5 is moved away from the first prism pair 5 in the length direction of the light entrance surface 2a for such a distance that the second prism pair 5 is free from interfering with the virtual plane, wherein the width of the flat portion 4a is set equal to or greater than the distance. More preferably, the minimum width of the flat portion 4a is determined with the virtual plane inclined at an angle of 70 degrees with respect to the optical axis. Specifically in the present embodiment, the width of the flat portion 4a is determined such that the width of the first prism piece 6, the width of the second prism piece 7 and the width of the flap portion 4a (these widths are defined by respective lengths projected onto the light entrance surface 2a) fall in a ratio of 1:1:1.

Also, in the present embodiment, two adjacent prism pairs 5 are disposed with a pitch Pi of 0.15 mm. The pitch Pi between the two adjacent prism pairs 5 is to be set such that a plurality (for example, several to several ten) of prism pairs 5 face a light emitting face 30a of one LED 30. In this connection, the light introducing prism mechanism 4 may be provided uninterruptedly along the entire length of the light entrance surface 2a of the light guide plate 2 or interruptedly corresponding to the disposition of the LEDs 30.

Figure 3A:
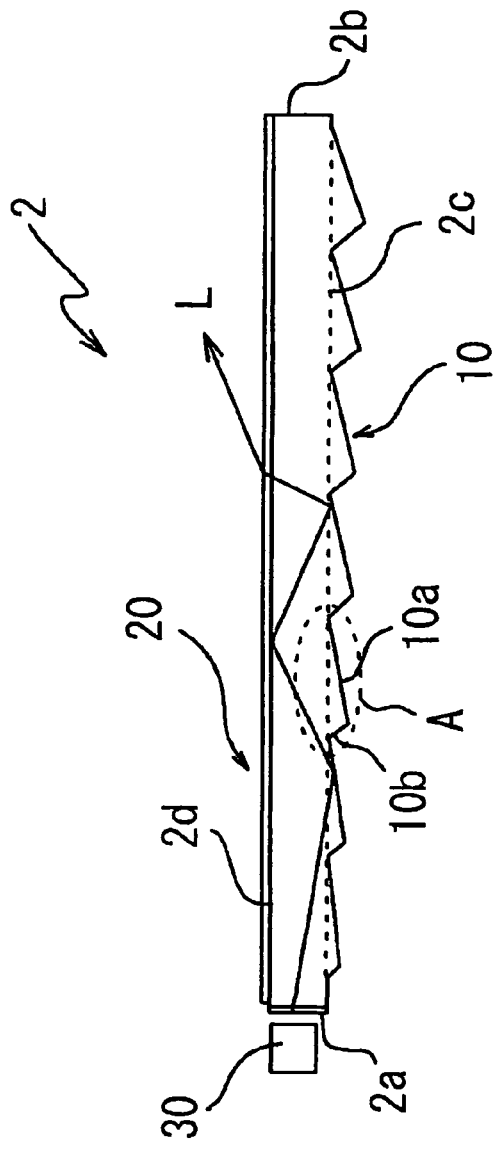
FIG. 3A is a schematic side view of an example of light guide plate of the spread illuminating apparatus of FIG. 1.
Figure 3B:
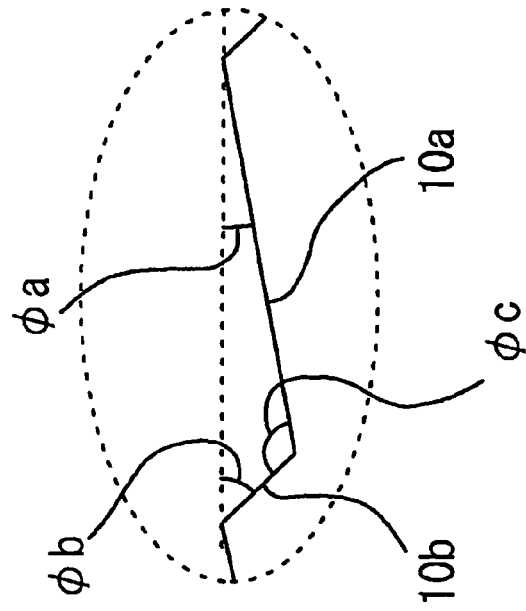
FIG. 3B is an enlarged view of a portion enclosed by a broken line A in FIG. 3A.

Description will then be made on the light emitting pattern 10 formed at the bottom surface 2c of the light guide plate 2 with reference to FIGS. 3A and 3B.

The light emitting pattern 10 is formed such that a plurality of prisms, each of which includes a first inclined face 10a facing toward the light entrance surface 2a of the light guide plate 2 and a second inclined face 10b facing toward a side surface (opposite side surface) 2b of the light guide plate 2 opposite to the light entrance surface 2a, are continuously arrayed between the light entrance surface 2a and the opposite side surface 2b as shown in FIG. 3A, wherein an angle φa, which the first inclined face 10a makes with a virtual plane (shown by a broken line corresponding to the bottom surface 2c of the light guide plate 2) passing each prism valley as shown in FIG. 3B, increases with an increase in distance from the light entrance surface 2a. In the present embodiment, the angle φa ranges from a minimum of 0.3 degrees up to a maximum of 20 degrees. On the other hand, because a vertex angle φc of each prism is set constant at 120 degrees regardless of the distance from the light entrance surface 2a, an angle φb, which the second inclined face 10b makes with the virtual plane, is calculated as: φb=(180−120−φa) degrees= (60−φa) degrees. Also, the light emitting pattern 10 has a constant prism pitch of 0.15 mm.

With the light emitting pattern 10 structured as described above, light introduced into the light guide plate 2 from the light entrance surface 2a and incident on the first inclined face 1a is reflected in such a direction so as to be incident on the top surface 2d of the light guide plate 2 at an angle reduced by about 2 φa. The light is reflected iteratively at the bottom surface 2c and the top surface 2a of the light guide plate 2, whereby part of the light that is incident on the top surface 2d (the light diffusing pattern 20) at an angle smaller than a critical angle θc is caused to exit the light guide plate 2 from the top surface 2d (refer to a light ray L in FIG. 3A). As described above, the light emitting pattern 10 is structured such that the angle φa of each prism increases with an increase in distance from the light entrance surface 2a. Consequently, light traveling in the light guide plate 2 and incident on the first inclined face 10a positioned farther from the light entrance surface 2a is reflected with a larger angle change and therefore is more likely to exit the light guide plate 2 from the top surface 2d. That is to say, light is emitted from the top surface 2d of the light guide plate 2 with a larger emission ratio in an area located toward the opposite side surface 2b than in an area located toward the light entrance surface 2a. As a result, the unfavorable condition that the light emission amount from the top surface 2d decreases with an increase in distance from the light entrance surface 2a, which is caused by the fact that the amount of light traveling in the light guide plate 2 decreases with an increase in distance from the light entrance surface 2a, can be compensated for, whereby light can be emitted in a substantially uniform manner entirely from the top surface 2d of the light guide plate 2 (macroscopically uniformly).

Description will next be made on the light diffusing pattern 20 formed at the top surface 2d of the light guide plate 2 with reference to FIGS. 4A, 4B and 4C.

Figure 4A:
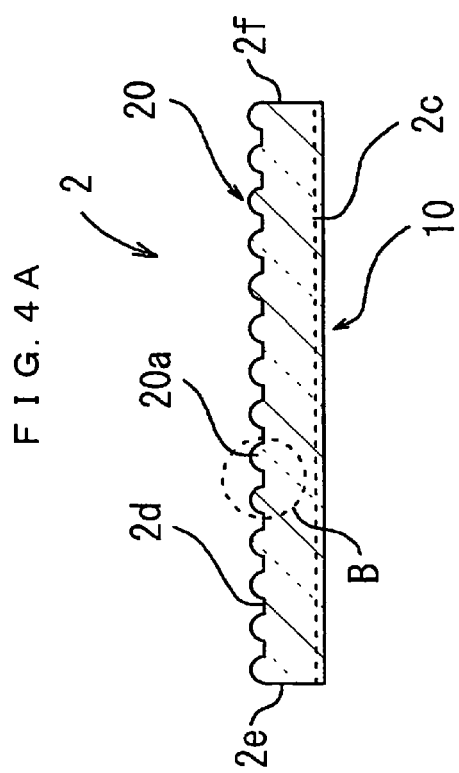
FIG. 4A is a schematic cross sectional view of the light guide plate of FIG. 3A, taken along a line parallel to a light entrance surface.
Figure 4B:
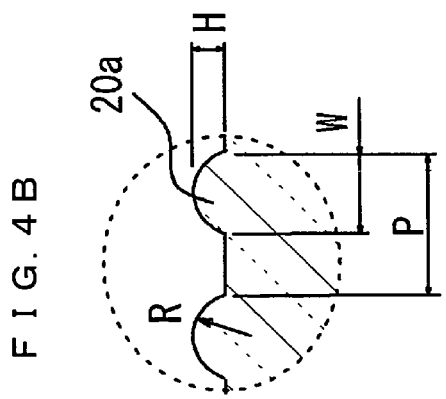
FIG. 4B is an enlarged view of a portion enclosed by a broken line B in FIG. 4A.
Figure 4C:
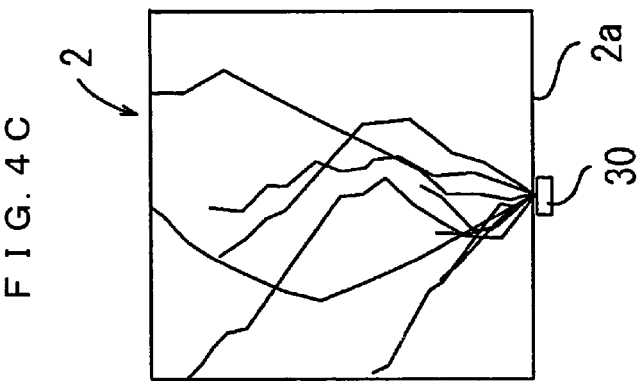
FIG. 4C is a top plan view of the light guide plate, explaining behavior of light rays.

Referring to FIG. 4A, the light diffusing pattern 20 is formed such that a plurality of arc prisms 20a extending in the direction substantially perpendicular to the light entrance surface 2a and arrayed repeatedly in the direction along the length of the light entrance surface 2a with a predetermined distance provided between every two adjacent prisms. That is to say, the light diffusing pattern 20 is structured such that the top surface 2d of the light guide plate 2 is rugged with the plurality of arc prisms 20a extending in the direction substantially perpendicular to the light entrance surface 2a. Referring to FIG. 4B, in the present embodiment, the arc prism 20a has a cross sectional shape having, for example, a radius R of 0.05 mm, a height H of 0.017 mm, and a width W of 0.06 mm. The light diffusing pattern 20 has a prism pitch P of 0.10 mm.

With the light diffusing pattern 20 structured as described above, light incident on the top surface 2d of the light guide plate 2 is reflected at the prism faces (curved faces) of the light diffusing pattern 20 and thereby can be scattered randomly with respect to the direction parallel to the light entrance surface 2a of the light guide plate 2. As a result, light traveling in the light guide plate 2 can be made uniform.

Description will further be made on the LEDs 30 disposed along the light entrance surface 2a of the light guide plate 2. The LED 30 is, for example, a pseudo-white LED including a blue LED and yellow phosphor, and functions as a light source to emit light in a radial pattern. Referring back to FIG. 2, the LED 3 is disposed with the light emitting face 30a oriented parallel to the light entrance surface 2a of the light guide plate 2 and also with a predetermined distance provided from the light entrance surface 2a, but the LED 30 may alternatively be disposed with the light emitting face 30a making contact with the prism apexes of the light introducing prism mechanism 4.

Advantageous effects of the spread illuminating apparatus 1 with the above-described structure according to the embodiment of the present invention will hereinafter be described.

Light emitted from the LED 30 is dispersed by the light introducing prism mechanism 4 formed at the light entrance surface 2a of the light guide plate 2 in a radial pattern with respect to the direction parallel to the major surface of the light guide plate 2. The behavior of light emitted from the LED 30 after incident on the light introducing prism mechanism 4 will be described with reference to FIGS. 5A and 5B.

FIG. 5A is a schematic view of optical paths of lights incident on the prism pair 5 of the light introducing prism mechanism 4, observed from above the top surface 2d of the light guide plate 2, and FIG. 5B is a chart showing calculation result of light distribution characteristics of lights introduced into the light guide plate 2. The light distribution characteristics refer to the angular distribution of light flux when the optical axis direction is 0 degree. An angle with respect to the optical axis (travel angle, hereinafter also referred to simply as "angle" as appropriate) is defined for descriptive purposes such that the right hand direction from the optical axis is a plus direction and the left hand direction therefrom is a minus direction, but the angular distribution basically produces a symmetrical pattern about the optical axis and so description below will be made on the plus direction unless specifically mentioned otherwise. In this connection, the light guide plate 2 is made of polycarbonate resin by injection molding and has a refractive index of 1.58 in the visible light range.

Referring to FIG. 5A, respective lights incident on the first light incidence faces 6a and 7a of the prism pair 5 are caused to travel symmetrically with respect to each other with a certain angular distribution centered on the direction inclined at about 15 degrees from the optical axis according to the inclination angle of the first light incidence faces 6a and 7a with respect to the light entrance surface 2a. On the other hand, respective lights incident on the second light incidence faces 6b and 7b of the prism pair 5 are caused to travel symmetrically with respect to each other with a certain angular distribution centered on the direction inclined at about 70 degrees from the optical axis according to the inclination angle of the second light incidence faces 6b and 7b with respect to the light entrance surface 2a.

If the above described lights traveling in respective four different directions and light incident on the flat portion 4a (traveling in the direction centered on the optical axis) are synthesized, the maximum light flux is obtained at a point with an angle of substantially 0 degree (optical axis direction) and a local minimum light flux is found at a point with an angle of about 50 degrees as shown in FIG. 5B. And, in the light distribution, two sub-peaks are seen each at a point with an angle range between 50 degrees and 85 degrees, thus presenting a multi-peak (three peak) distribution, specifically with one main peak and two sub-peaks.

Figure 6:
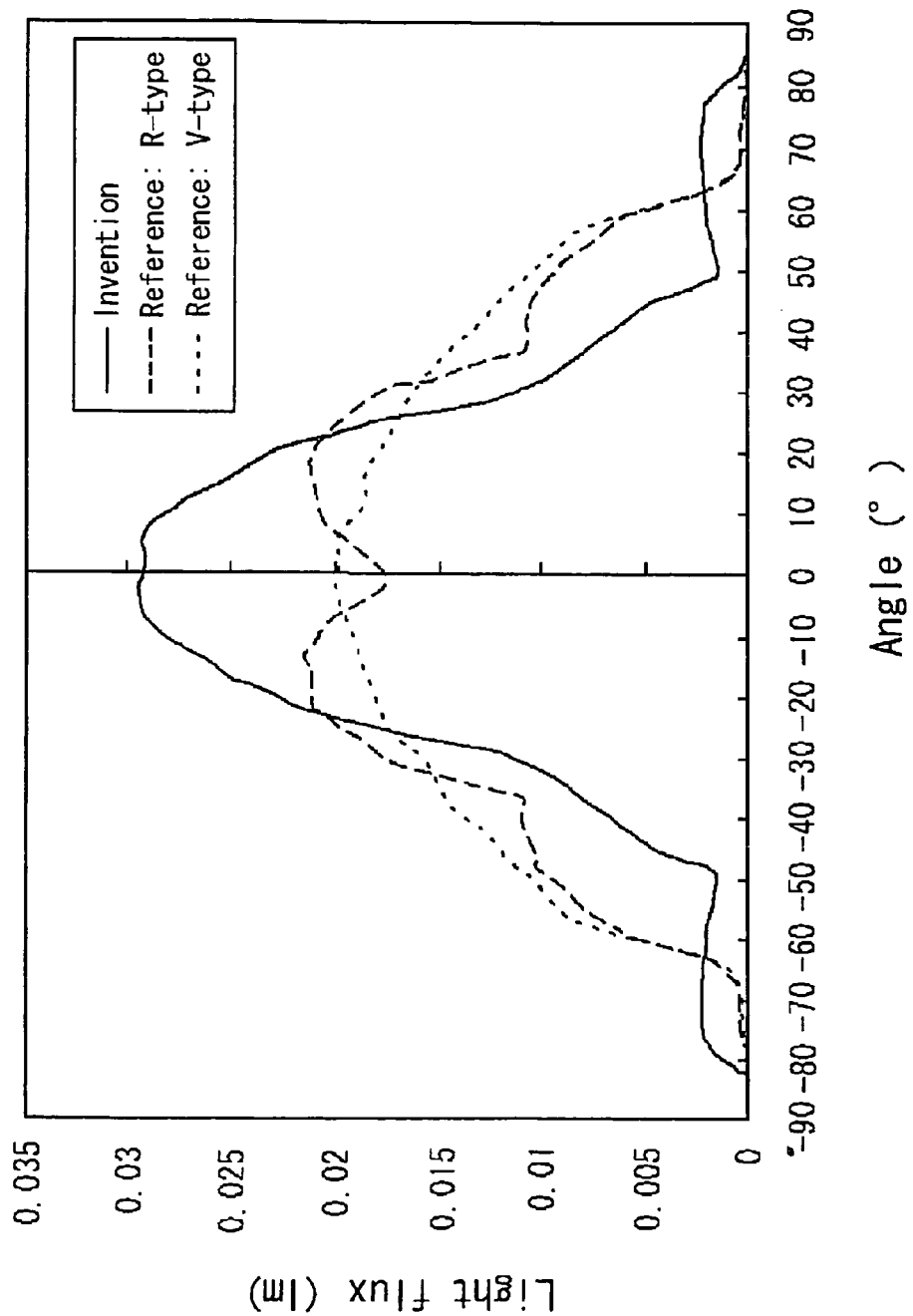
FIG. 6 is a light distribution graph, where distributions of lights introduced from respective conventional light introducing prism mechanisms are additionally shown as reference example.

Now, two typical conventional light introducing prism mechanisms as reference examples will be considered: one includes an arc prism with a radius of 50 μm and a height of 35 μm (R-type), and the other includes an isosceles triangle prism with an apex angle of 100 degrees (V-type). FIG. 6 shows the light distributions of the two typical conventional prisms in comparison with the light distribution of the light introducing prism mechanism 4 of the present invention. Referring to FIG. 6, in both of the two conventional light introducing prism mechanisms, the light flux at a point with an angle of (90−θc) degrees is about ½ of the maximum light flux thus representing a large amount, and also the angle change ratio is small. When light with such distribution characteristics travels in the light guide plate 2, brightness discontinuity caused at a point with an angle of (90−θc) degrees is noticeable. Meanwhile, at a point with an angle of greater than 60 degrees, the light flux decreases drastically, which results in that the amount of light emitted from the top surface 2d of the light guide plate 2 is decreased drastically starting from a point with an angle of about 60 degrees which is larger than the angle value of (90−θc) degrees. Accordingly, it is assumed that when any of the conventional light introducing prism mechanisms is used, a bright line is generated in a certain angle direction due to the above described brightness discontinuity in combination with the drastic decrease in the amount of emitted light at a point with an angle of around 60 degrees and upward.

On the other hand, referring to FIGS. 5B and 6, in the distribution characteristics of the light introducing prism mechanism 4 according to the present invention, the flux of light traveling in the direction of an angle ranging from 30 degrees to 60 degrees is reduced compared with the conventional examples, wherein the flux decreases steeply especially from a point with an angle of 40 degrees through an angle of 50 degrees and then reaches a local minimum at an angle of about 50 degrees where a bright line is generated. At this point, the light flux is less than ⅒ of the maximum light flux. Then, the light flux increases at a point with an angle of more than 50 degrees and is still available even at a point with an angle of more than 80 degrees.

Thus, it is assumed that in the present invention, an angle at which the light flux reaches a local minimum set to substantially coincide with an angle at which a bright line is generated, and also the light distribution is established such that a sub-peak is found at a point with an angle ranging from the abovementioned angle up to more than 80 degrees, whereby the generation of bright lines is suppressed and at the same time the brightness uniformity at the neighborhood of the light entrance surface 2a of the light guide plate 2 is enhanced. In order to achieve such effects, the angle θa the first light incidence faces 6a and 7a make with the light entrance surface 2a preferably ranges from 0 degree up to 30 degrees, more preferably from 0 degree up to 20 degrees, and the angle θb the second light incidence faces 6b and 7b make with the light entrance surface 2a preferably ranges from 45 degrees up to 90 degrees, more preferably from 60 degrees up to 90 degrees. With the arrangement described above, the bright lines are suppressed from being generated at a high level and at the same time the bright uniformity at the area close to the light entrance surface is improved.

Some of the lights distributed by the light introducing prism mechanism 4 in the predetermined directions and traveling in the light guide plate 2 in the predetermined directions travel toward the bottom surface 2c of the light guide plate 2 and are reflected at the first inclined face 10a of the light emitting pattern 10 so that the lights reflected are incident on the top surface 2d of the light guide plate 2 at a small angle. Some of the lights traveling toward the top surface 2d go through the light diffusing pattern 20 formed at the top surface 2d and exit the light guide plate 2, and the other of the lights traveling toward the top surface 2d are reflected back by the light diffusing pattern 20 and continue to travel in the light guide plate 2.

Thus, the lights introduced into the light guide plate 2 via the light introducing prism mechanism 4, while traveling in the light guide plate 2, are reflected iteratively at the bottom surface 2c and the top surface 2d and exit the light guide plate 2 when incident on the light diffusing pattern 20 at an angle smaller than the critical angle θc relative to air (medium to cover the light guide plate 2). The lights which exit the light guide plate 2 go though the light diffusing sheet 34 to be thereby diffused, and then go through the pair of prism sheets 36 and 38 whereby the lights have a prescribed light emission angle distribution centered on the normal line direction of the prism sheets 36 and 38 with respect to the two axis directions orthogonal to each other. As a result, the spread illuminating apparatus 1 is adapted to radiate a macroscopically and microscopically uniform illumination light to an illuminated body (for example, an LCD panel).

Also, in the present invention, light is enabled to travel in a direction with an angle of more than 80 degrees, and therefore enhanced brightness is achieved at the corner areas of the light guide plate 2, whereby the ineffective area is reduced. In the case of the conventional light introducing prism mechanism which provides a narrow light distribution (0 degree to ±65 degrees), the plurality (for example, six pieces) of LEDs 30 must be arrayed uniformly with respect to the entire length of the light entrance surface 2a of the light guide plate 2 in order to minimize the ineffective area on the whole of the light guide plate 2 (refer to FIG. 7A), wherein both outmost LEDs 30 L and 30R must be located close respectively to the both ends of the length of the light entrance surface 2a, whereby the distance between the outmost LED 30 L/30R and side surface 2e /2f of the light guide plate 2 orthogonal to the light entrance surface 2a is small, which can possibly result in that lights from the LEDs 30L and 30R leak from the side surfaces 2e and 2f thus deteriorating the brightness.

On the other hand, in the case of the light introducing prism mechanism 4 according to the present invention, the light distribution is wide (0 degree to ±80 degrees), and therefore the plurality of LEDs 30 can be disposed concentratedly toward the center of the length of the light entrance surface 2a, whereby the distance between the outmost LED 30L/30R and the side surface 2e /2f is increased, and the lights from the LEDs 30L and 30R are less likely to leak from the side surfaces 2e and 2f thus enabling improvement of the average brightness of illumination light.

The present invention has been described with reference to the specific embodiment, but the present invention is not limited to the embodiment described above, and various modifications and combinations are possible.

For example, the light introducing prism mechanism 4 may alternatively be configured as shown in FIGS. 8A to 8F.

A light introducing prism mechanism 4A shown in 8A is formed to recede with respect to a light entrance surface 2a. A light introducing prism mechanism 4B shown in FIG. 8B includes another flat portion 4b between two first light incidence faces 6a and 7a. A light introducing prism mechanism 4C shown in FIG. 8C does not include a flat portion 4a between two adjacent second light incidence faces 6b and 6b whereby a plurality of prism pairs 5 are arrayed uninterruptedly.

Figure 8A:
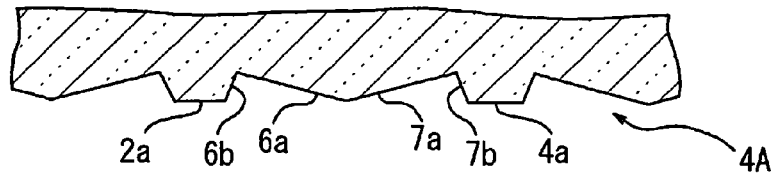
FIGS. 8A to 8F are horizontal cross sectional views of various examples of light introducing prism mechanisms applicable to the spread illuminating apparatus according to the present invention.
Figure 8B:
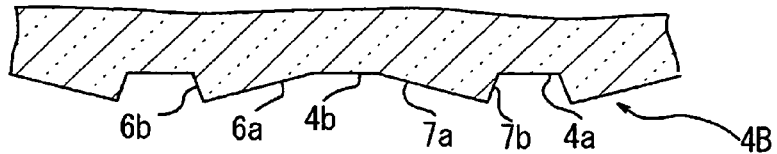
Figure 8C:
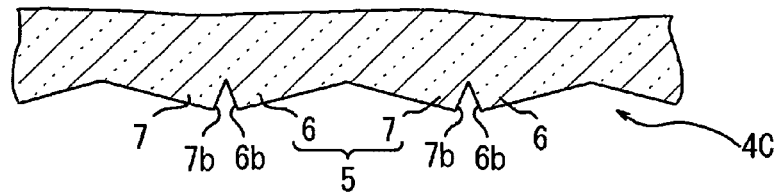
Figure 8D:
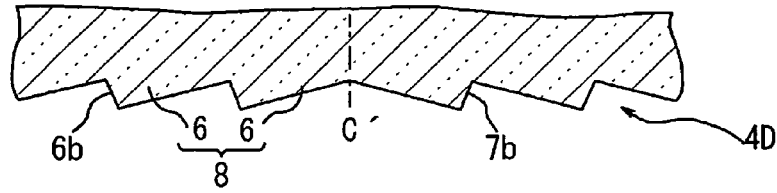

A light introducing prism mechanism 4D shown in FIG. 8D includes a prism array 8 composed of a plurality of prism pieces 6 arrayed in succession in a parallel shift manner along a light entrance surface 2a, and further includes another prism array configured and disposed reflection-symmetrically to the prism array 8 about a symmetry plane C'. In the light introducing prism mechanism 4D, since it does not happen that a second light incidence face 6b and a second light incidence face 7b are adjacent to each other, a flat portion 4a is not provided, and still the advantageous effects attributed to the provision of the flat portion 4a in the light introducing prism mechanism 4 are achieved.

Figure 8E:
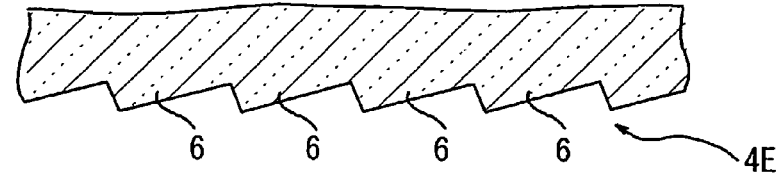
Figure 8F:
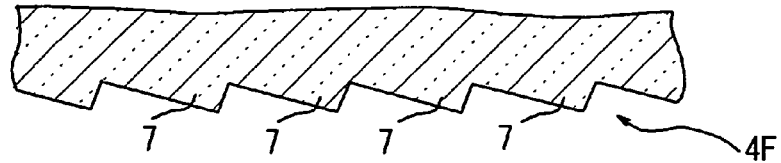
Figure 10:
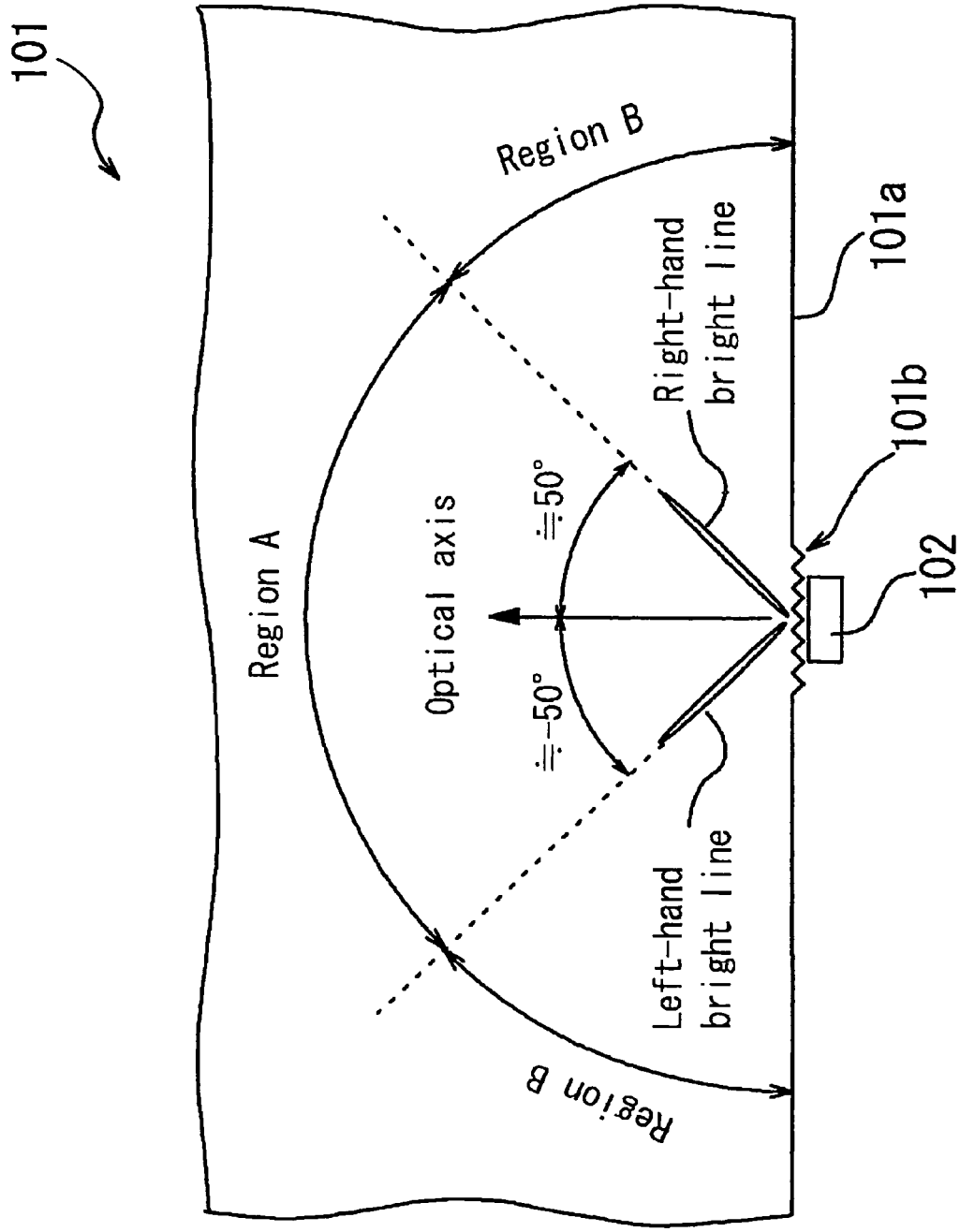
FIG. 10 is an explanatory top plan view of a relevant portion of a conventional spread illuminating apparatus, showing generation of bright lines.

A light introducing prism mechanism 4E shown in FIG. 8E includes a plurality of prism pieces 6 arrayed in succession in a parallel shift manner. A light introducing prism mechanism 4F shown in FIG. 8F includes a plurality of prism pieces 7 arrayed in succession in parallel shift manner. The light introducing prism mechanisms 4E and 4F may be applied to the light guide plate 2 shown in FIG. 7B such that the light introducing prism mechanism 4E is disposed at a portion of the light entrance surface 2a corresponding to the right outmost LED 30R while the light introducing prism mechanism 4F is disposed at a portion corresponding to the left outmost LED 30L. In this case, a light introducing prism mechanism having a symmetric structure may be disposed at a portion of the light entrance surface 2a corresponding to the LEDs 30 located toward the center of the light entrance surface 2a, or no light introducing prism mechanism may be disposed there.

In any of the introducing prisms described above, the first and second light incidence faces 6a, 7a, 6b and 7b do not have to be flat but may be curved or multifaceted. When the light incidence faces are curved or multifaceted, an angle θa that a tangential plane at any point of the curved or multifaceted face constituting the first light incidence face makes with the light entrance surface 2a preferably ranges from 0 degree up to 30 degrees, more preferably up to 20 degrees, and an angle θb that a tangential plane at any point of the curved or multifaceted face constituting the second light incidence face makes with the light entrance surface 2a preferably ranges from 45 degrees up to 90 degrees, more preferably from 60 degrees up to 90 degrees. Also, the prism pieces 6 (or 7) do not have to be shaped identically to one another but may be shaped differently from one another.

The light introducing prism mechanism 4 described above is suitable when the light emitting face 30a of the LED 30 is substantially flat. On the other hand, referring to FIG. 9, when an LED 31 having a semi-cylindrical lens portion 31a made of transparent resin at its light emitting face is used as a point light source, a light introducing prism mechanism 4G may be applied. The light introducing prism mechanism 4G is structured such that a recess 2g is provided at a light entrance surface 2a of a light guide plate 2 and adapted to house the substantially entire part of the lens portion 31a of the LED 31, wherein the recess 2b has a pair of first light incidence faces 6a and 7a formed at its wall surface and disposed reflection-symmetrically to each other about a symmetry plane C" passing the optical axis and oriented perpendicular to a top surface 2d of the light guide plate 2, and a pair of second light incidence faces 6b and 7b disposed reflection-symmetrically to each other about the symmetry plane C". The first light incidence faces 6a and 7a have their respective one ends abutting each other at the symmetry plane C", and the second light incidence face 6b and 7b each connect between the other end of each of the first light incidence faces 6a and 7a and the light entrance surface 2a. In the light introducing prism mechanism 4G described above, the generation of bright lines is suppressed and the bright uniformity at an area close to the light entrance surface 2a is improved. The pair of first light incidence faces 6a and 7a may alternatively be constituted by one continuous curve, in which case the angle which a tangential plane at any point of the continuous curve makes with the light entrance surface 2a preferably ranges from 0 degree up to 30 degrees, more preferably up to 20 degrees.

The light emitting pattern 10 also is not limited in structure to the embodiment described above and may be a dot pattern formed, for example, such that a plurality of minute spots having a roughed surface, or a plurality of semispherical (domed) recesses or bosses are provided at a bottom surface 2c of a light guide plate 2. Also, a light guide plate 2 may be structured such that a bottom surface 2c is inclined relative to a top surface 2d so that the thickness decreases with an increase in distance from a light entrance surface 2a, whereby light is emitted gradually from the top surface 2d. The light guide plate 2 that has its bottom surface 2c inclined relative to the top surface 2d as described above is included in the scope of the present invention. When any type of light emitting patterns structured as described in the embodiment and the modification examples is provided, bright lines are likely to appear clearly, but if the light introducing prism mechanism according to the present invention is disposed at the light entrance surface of the light guide plate, the bright lines are duly suppressed thereby effectually achieving the advantageous effects of the present invention. As a result, a spread illuminating apparatus is provided which is excellent in brightness uniformity macroscopically and microscopically.

Further, the light diffusing pattern 20 with a rugged surface is not limited in structure to the embodiment, and the present invention may include a light diffusing pattern which has its rigged surface formed by triangular prisms in place of arc prisms. Also, a flat portion may not be provided between two adjacent prisms so that the prisms are arrayed uninterruptedly, or a prism with a different size may be provided between two adjacent prisms. Or, the prisms may be shaped differently from one another. Furthermore, the light diffusing pattern 20 may be formed by hair line process. And, the light diffusing pattern 20 may be disposed at the bottom surface 2c of the light guide plate 2, rather than at the top surface 2d, in which case the light emitting pattern 10 is disposed at the top surface 2d.

The optical sheets disposed at the top surface 2d of the light guide plate 2 are not limited in arrangement to the embodiment. For example, only one of the prism sheets 36 and 38 may be disposed. Or, only the light diffusing sheet 34 may be disposed while the prism sheets 36 and 38 are not disposed. And, the optical sheets do not have to be laminated in the order described in the embodiment.

What is claimed is:

1. A spread illuminating apparatus comprising:
   a point light source; and
   a light guide plate comprising:
      a light entrance surface provided with a light introducing prism mechanism, the point light source being disposed to face the light entrance surface;
      a major surface provided with a light emitting pattern for emitting light from the point light source in a spread manner; and
      another major surface provided with a light diffusing pattern having a ridge-and-groove structure with a plurality of ridges and grooves extending in a direction perpendicular to the light entrance surface, wherein the light introducing prism mechanism comprises a plurality of prism pieces which are arrayed along the light entrance surface and each of which comprises a first light incidence face for introducing the light from the point light source into the light guide plate in a direction generally perpendicular to the light entrance surface and a second light incidence face for introducing the light from the point light source into the light guide plate in a direction generally parallel to the light entrance surface.

2. A spread illuminating apparatus according to claim 1, wherein the first light incidence face of the prism piece is inclined relative to the light entrance surface of the light guide plate at an angle ranging from 0 degree to 30 degrees, and the second light incidence face of the prism piece is inclined relative to the light entrance surface at an angle ranging from 45 degrees to 90 degrees.

3. A spread illuminating apparatus according to claim 1, wherein when the light from the point light source is introduced into the light guide plate through the light introducing prism mechanism, a local minimum is found at a light flux traveling in a direction inclined relative to an optical axis at an angle of substantially (90-$\theta$c) degrees where $\theta$c is a critical angle of a material for the light guide plate.

4. A spread illuminating apparatus according to claim 1, wherein the light introducing prism mechanism comprises a plurality of prism pairs disposed along the light entrance surface of the light guide plate, each of the prism pairs being constituted such that adjacent two of the plurality of prism pieces are disposed symmetrically to each other.

5. A spread illuminating apparatus according to claim 4, wherein a flat portion is disposed between adjacent two of the second light incidence faces.

6. A spread illuminating apparatus according to claim 1, wherein the light introducing prism mechanism comprises two prism arrays which are each structured such that the plurality of prism pieces are arrayed in succession in a parallel shift manner along the light entrance surface of the light guide plate and which are formed symmetrically to each other.

7. A spread illuminating apparatus according to claim 1, wherein the point light source comprises a semi-cylindrical lens portion, and the light introducing prism mechanism comprises a prism pair which is constituted such that two of the plurality of prism pieces are disposed symmetrically to each other at a wall surface of a recess disposed at the light entrance surface of the light guide plate so as to house the lens portion of the point light source.

8. A spread illuminating apparatus according to claim 1, wherein the light emitting pattern has a light emission ratio increasing with an increase in distance from the light entrance surface of the light guide plate.

* * * * *